(12) United States Patent
Lisenbee

(10) Patent No.: US 6,907,235 B2
(45) Date of Patent: Jun. 14, 2005

(54) APPARATUS AND METHOD FOR CANCELING DC OFFSET IN COMMUNICATIONS SIGNALS

(75) Inventor: Layne Lisenbee, San Diego, CA (US)

(73) Assignee: Texas Instruments Incorporated, Dallas, TX (US)

( * ) Notice: Subject to any disclaimer, the term of this patent is extended or adjusted under 35 U.S.C. 154(b) by 378 days.

(21) Appl. No.: 09/953,835

(22) Filed: Sep. 17, 2001

(65) Prior Publication Data
US 2002/0123320 A1 Sep. 5, 2002

Related U.S. Application Data

(60) Provisional application No. 60/259,330, filed on Jan. 2, 2001.

(51) Int. Cl.[7] ................................................ H04B 1/10
(52) U.S. Cl. ........................ 455/296; 455/323; 375/346
(58) Field of Search ................................. 455/296, 317, 455/310, 323, 324, 313; 375/346, 296, 326, 319

(56) References Cited

U.S. PATENT DOCUMENTS

| | | | |
|---|---|---|---|
| 4,736,390 A | 4/1988 | Ward et al. | |
| 4,926,443 A | 5/1990 | Reich | |
| 5,086,437 A | 2/1992 | Tomita | |
| 5,241,702 A | 8/1993 | Dent | |
| 5,263,194 A | 11/1993 | Ragan | |
| 5,442,655 A | 8/1995 | Dedic et al. | |
| 5,584,059 A | 12/1996 | Turney et al. | |
| 6,154,158 A | 11/2000 | Walker | |
| 6,175,728 B1 * | 1/2001 | Mitama | 455/323 |
| 6,188,880 B1 | 2/2001 | Sanielevici | |
| 6,192,225 B1 | 2/2001 | Arpaia et al. | |
| 6,240,100 B1 * | 5/2001 | Riordan et al. | 370/442 |

* cited by examiner

Primary Examiner—Melur Ramakrishnaiah
(74) Attorney, Agent, or Firm—Abdul Zindani; W. James Brady, III; Frederick J. Telecky, Jr.

(57) ABSTRACT

An apparatus for removing DC offset in a received data signal is presented. The apparatus measures the DC offset present in a data symbol and uses it to generate a compensation value which is then removed from a future data symbol. An enable signal is used to prevent updating of the compensation value during the reception of a data symbol.

31 Claims, 4 Drawing Sheets

APPARATUS AND METHOD FOR CANCELING DC OFFSET IN COMMUNICATIONS SIGNALS

This application claims priority to the provisional application entitled "Method for Canceling DC Offset from Radios in a Wireless Modem", U.S. patent application Ser. No. 60/259,330, filed Jan. 2, 2001.

FIELD OF THE INVENTION

This invention relates generally to communications, and particularly to the removal of DC offsets in communications signals.

BACKGROUND OF THE INVENTION

Radio communications systems use transmitters to transmit modulated radio frequency (RF) signals and receivers to process the received RF signals. Typical processing of received RF signals involve converting relatively high-frequency incoming signals to a relatively low-frequency signal, which is then demodulated to extract useful information from the originally transmitted signal. The frequency conversion process usually introduces low-frequency distortion, most commonly in the form of a direct current offset (DC offset) signal, into the converted signal. The DC offset is especially problematic with amplifiers and analog-to-digital converters in the radio receiver because an excessively large DC offset can result in the amplifiers distorting the demodulated signal while compressing the useful range of the analog-to-digital converters and reducing its effective resolution.

The majority of radio receivers today use a superheterodyne architecture, which can perform multiple frequency conversion to the input signal before it is finally demodulated. Typically, the demodulation is performed at an intermediate frequency (IF), which is low enough for easy amplification but remains high enough to accommodate the modulated signal. Due to the use of potentially multiple frequency conversions and high intermediate frequencies, the removal of most of the DC offsets in superheterodyne architecture receivers can be readily achieved through the use of high pass filters.

In another type of radio receivers, known as direct-conversion receivers, the received signal is immediately converted down to a very low frequency (the baseband frequency) without going through any intermediate frequencies. Direct-conversion receivers are gaining popularity because they do not require any intermediate filters, mixers and amplifiers as does the superheterodyne receiver, therefore resulting in a simpler and less expensive radio receiver. The direct-conversion receiver can usually be integrated onto a single integrated circuit, mainly from their use of low-pass filters that are easily fabricated in monolithic form.

However, the actual frequency downconversion process used in direct-conversion receivers can introduce a significant amount of DC offset. Additionally, due to the received signal being centered around the zero frequency, the commonly used method to remove DC offset, high-pass filters, is not an effective solution. The use of high-pass filters to remove DC offset result in either loss or distortion of a significant amount of the downconverted signal. This results in an overall reduction in the available bandwidth. The filters can also introduce phase errors into the data signal. The reduction in available bandwidth and introduction of phase errors places limits on data rates and decreases the noise tolerance of the radio receiver.

Another proposed solution takes advantage of idle receive times in systems with intermittent transmission in order to store the DC offset present in the absence of the input signal and then subtract the stored value when receiving the input signal. This solution requires sufficient idle time in order to transmit the DC offset value. This solution also requires that the DC offset be measured early in the radio receiver's receive path and then the DC offset be removed later in the receive path. This is potentially problematic if the received signal has already been amplified and/or converted by an analog-to-digital converter and has been distorted prior to the DC offset removal. Additionally, in a high data-rate receiver application, sufficient idle time is simply not available to store the DC offset in the received signal. A need has therefore arisen for a method for removing the DC offset from a communications system which does not introduce phase errors or noise into the system and maximizes available bandwidth.

SUMMARY OF THE INVENTION

In one aspect, the present invention provides an apparatus for removing the DC offset from a data signal comprising a data input, a summing circuit for combining a data signal with a generated compensation value, a signal processing circuit for processing the data signal, a DC offset calculator and compensation value generator for measuring the DC offset in the data signal and generating the compensation value based on the measured DC offset, an enable signal to prevent the DC offset calculator and compensation value generator from modifying the compensation value when actual data symbols are being received.

BRIEF DESCRIPTION OF THE DRAWINGS

The above features of the present invention will be more clearly understood from consideration of the following descriptions in connection with accompanying drawings in which:

FIG. 1.b is a diagram illustrating a frequency response plot for a real-world filter suitable for use as a DC offset removal filter, with a notch centered at zero frequency;

FIG. 2.b is a diagram illustrating a data signal with a DC offset as shown in FIG. 2.a after being scaled to fit within an analog-to-digital converter's operating range;

FIG. 7.b is a plot illustrating a data stream for a communications system with a time variant DC offset present in the data stream with said time variant DC offset removed by an apparatus according to the preferred embodiment of the present invention;

DETAILED DESCRIPTION OF ILLUSTRATIVE EMBODIMENTS

The making and use of the various embodiments are discussed below in detail. However, it should be appreciated that the present invention provides many applicable inventive concepts which can be embodied in a wide variety of specific contexts. The specific embodiments discussed are merely illustrative of specific ways to make and use the invention, and do not limit the scope of the invention.

Figure 1A:
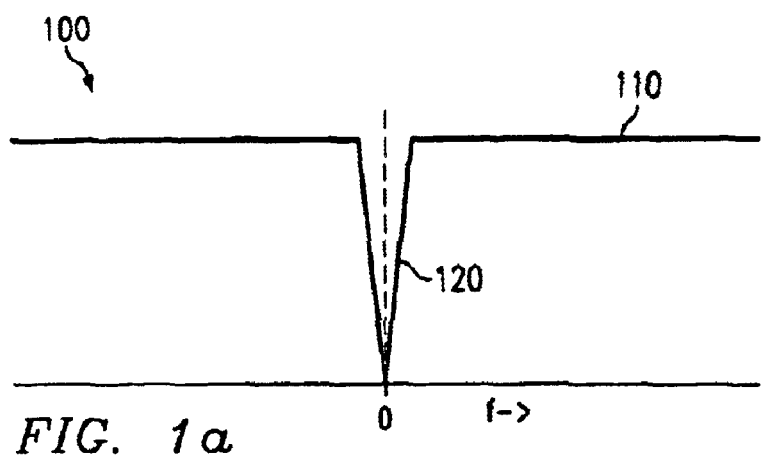
FIG. 1.a is a diagram illustrating a frequency response plot for an ideal filter suitable for use as a DC offset removal filter, with a notch centered at zero frequency.
Figure 1B:
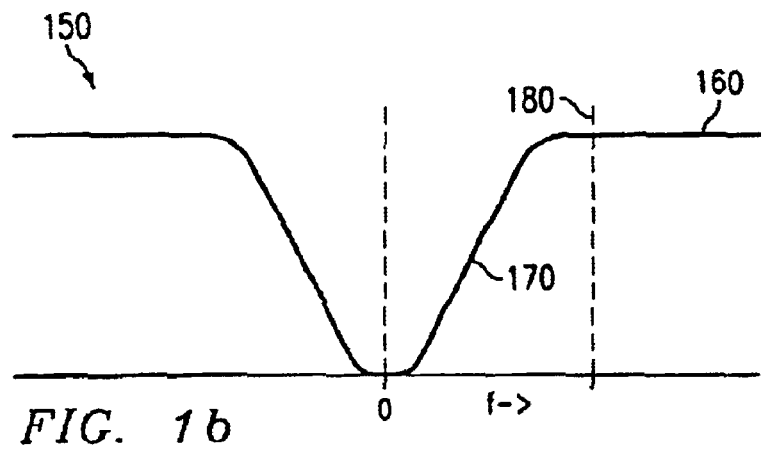

In many radio receivers, filters are used to remove DC offsets from a received data signal. FIG. 1.a displays a frequency response plot 100 for an ideal filter used in such a DC offset removal application. The filter's pass band 110 would be flat and its stop band would simply be the zero frequency signals (the DC offsets), i.e., the only frequency that the filter would not pass would be the zero frequency. Between the pass band 110 and the stop band will be an extremely sharp transition 120. The ideal filter would be able to filter out the DC offsets and minimally distort or introduce minimal phase shifts into the remainder of the data signal. Refer now to FIG. 1.b for a frequency response plot 150 for a real-world filter used in DC offset removal. The real-world filter has a relatively flat pass band 160, but has a shallow null at DC and a relatively slow transition 170 between the pass band 160 and the stop band. The frequency response plot 150 also displays a vertical dashed line 180. The frequency response of the filter between the dashed line 180 and the zero frequency line shows that the portions of the data signal with frequencies between the zero frequency and the dash line 180 will be attenuated. Many filters introduce phase shifts well beyond to point where there is attenuation. The attenuation and distortion leads to reduced bandwidth, increased error rates, and reduced noise immunity in the radio receiver that uses such a filter.

Figure 2A:
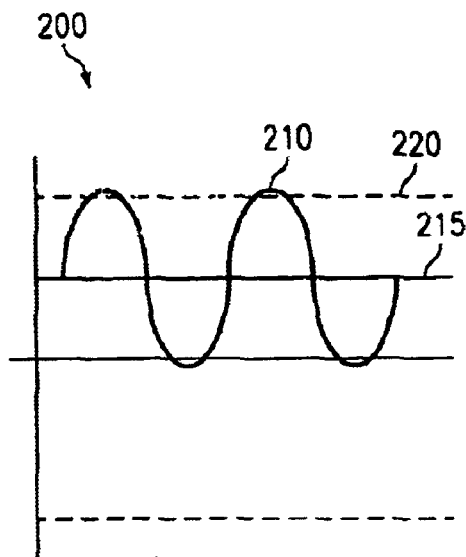
FIG. 2.a is a diagram illustrating a data signal with a DC offset.
Figure 2B:
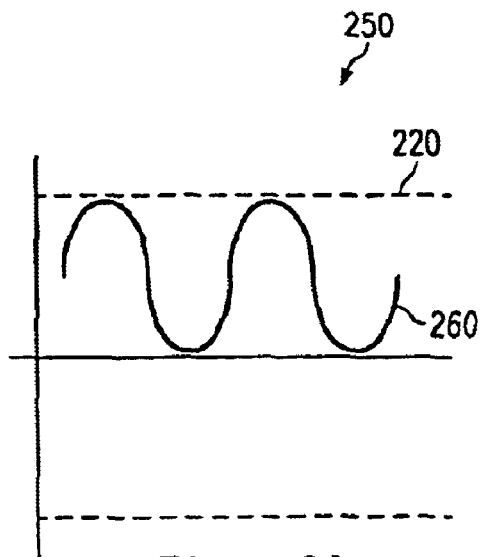

Referring now to FIGS. 2.a and 2.b for diagrams illustrating how DC offsets can reduce an analog-to-digital converter's effective resolution. FIG. 2.a displays a set of axes 200 with a data signal 210. The data signal 210 has a significant DC offset (shown as line 215). A dashed line 220 displays a maximum value for which the analog-to-digital converter is capable of generating a digital representation. Data signals with voltage values greater than the maximum value of the analog-to-digital converter are either represented as the maximum value or clipped. Therefore, in order to fully represent the data signal 210 that has several signal peaks exceeding the maximum value of the analog-to-digital converter, the data signal 210 must be scaled. FIG. 2.b displays the data signal 210 after it has been scaled to fit within the operational range of the analog-to-digital converter, shown as a scaled data signal 260. However, scaling may not reduce the DC offset significantly and the scaled data signal 260 retains a DC offset. The scaling of is the data signal 210 results in the scaled data signal 260 using only a small portion of the operational range of the analog-to-digital converter and wasting unused range. Had there been no DC offset or a small DC offset, the data signal 210 would have fit within the analog-to-digital converter's operational range, no scaling would have had to have taken place and no reduction in analog-to-digital resolution would have occurred.

Figure 3:
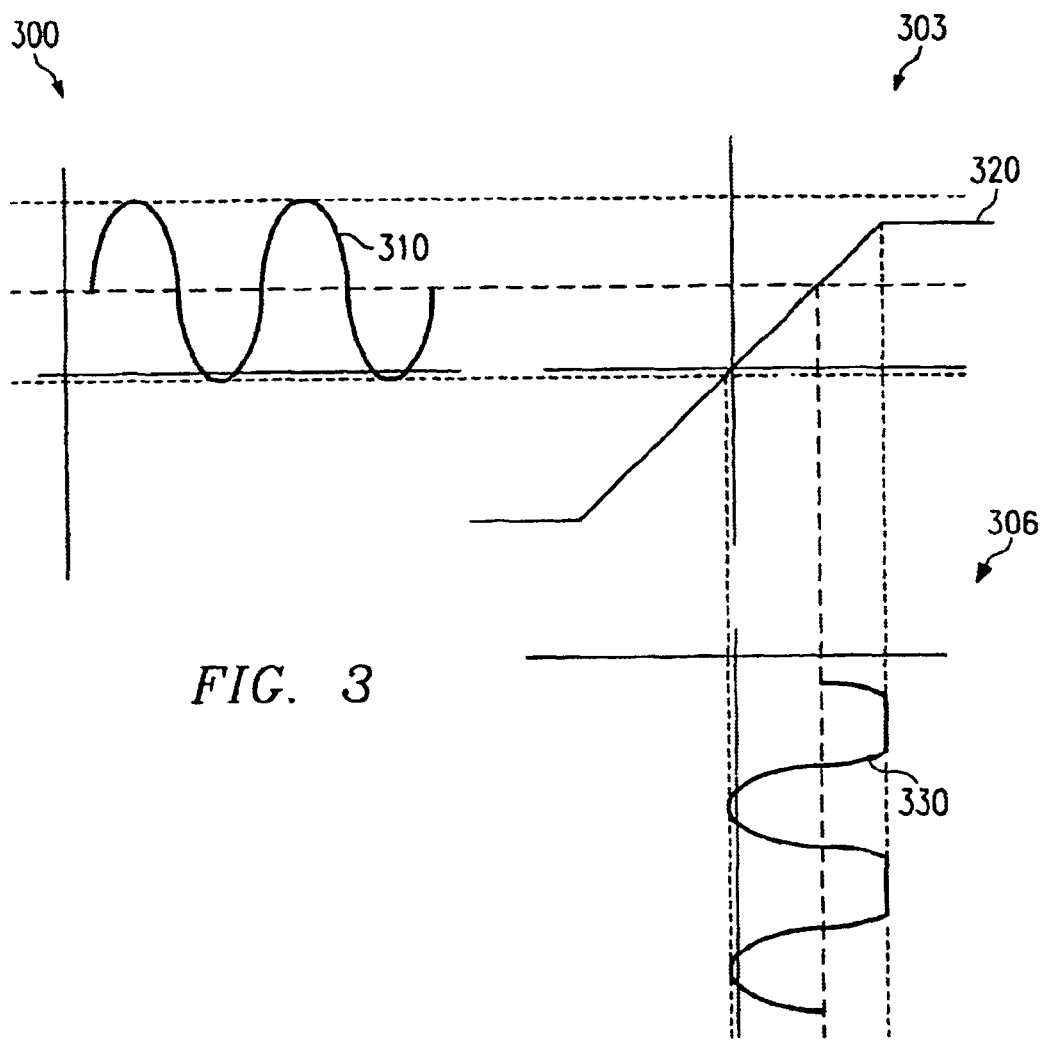
FIG. 3 is a diagram illustrating a data signal with a DC offset pushing an amplifier into operating in its non-linear region.

Refer now to FIG. 3 for a diagram illustrating a data signal with a large DC offset and how the large DC offset causes an amplifier to operate in its non-linear region. FIG. 3 displays three different sets of axes 300, 303, and 306. A data signal 310 with a significant DC offset is displayed on axes 300, a curve 320 displaying an amplifier's amplification characteristics is displayed on axes 303, and an amplified data signal 330 is displayed on axes 306. The data signal 310 is input to the amplifier with the amplification characteristics displayed as curve 320. Because of the data signal's large DC offset, the data signal 310 is not centered within the amplification range of the amplifier. In fact, the DC offset has pushed the top portions of the data signal 310 beyond the linear operating range of the amplifier. Beyond the linear operating range of the amplifier, the output of the amplifier becomes distorted and even clipped. The data signal 330 displays the output of the amplifier corresponding to the case with the signal 310 as the input. The top portions of the data signal 310 that were beyond the linear operating range of the amplifier were clipped by the amplifier. The DC offset resulted in a severely distorted output signal.

Figure 4:
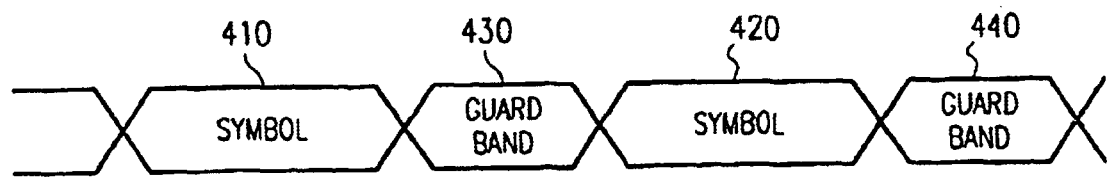
FIG. 4 is a diagram illustrating a data stream for a communications system.

Modern digital wireless communications systems use various modulation methods to transmit data. However, they use a common structure in the transmitting of the data. The smallest transmitted packet of information using any given modulation method is called a symbol or commonly, a data symbol. Information is transmitted as a stream of symbols with each of the symbols in the stream being separated by a guard band. A guard band is used to provide separation between the symbols and is used to permit transition from one symbol state to another. No additional data or information is contained within the guard band. The guard bands are usually shorter than a symbol. A typical guard band to symbol duration ratio is 1:4, where a guard band is one fourth the size of a symbol. FIG. 4 displays a typical communications system data stream, with symbols 410 and 420 separated by guard bands 430 and 440.

Figure 5:
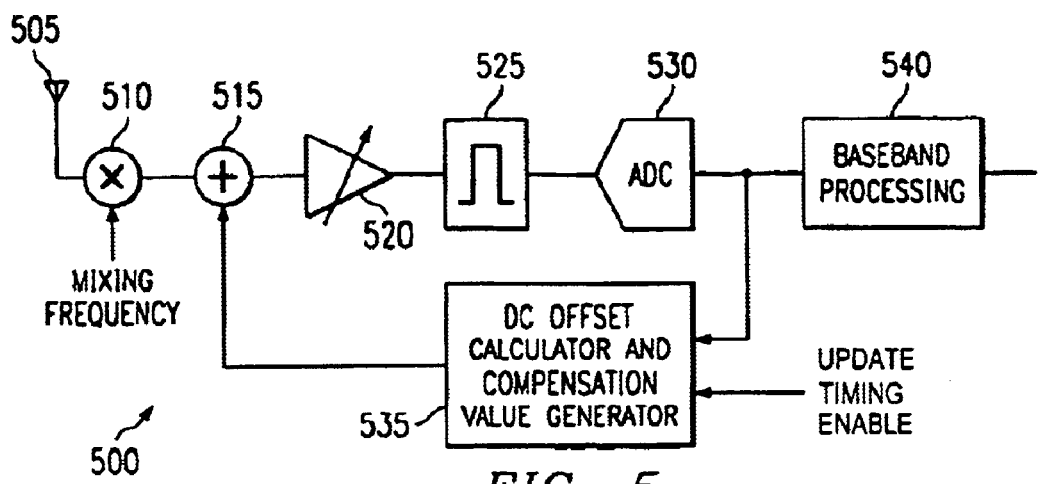
FIG. 5 is a diagram illustrating a DC offset removal apparatus according to a preferred embodiment of the present invention.

A direct-conversion radio receiver 500 is shown schematically in FIG. 5, displaying a preferred embodiment of the present invention. Since radio receiver architectures can vary drastically, the preferred embodiment of the present invention is described using one particular radio architecture. However, the preferred embodiment of the present invention is not limited to only the radio architecture described in these specifications and can readily be used in radio receivers of differing architectures.

A radio antenna 505 receives a received signal which was transmitted over the air and sends the received signal to a downconversion mixer circuit 510. The received signal was modulated onto a high frequency carrier signal by a radio transmitter and it needs to be demodulated down to a baseband frequency. The demodulation may occur in several steps, as in a superheterodyne receiver, or it may occur in one step, as in a direct-conversion receiver.

The downconversion mixer circuit 510 multiplies the received signal with a mixing frequency. After being downconverted, the received signal is combined with a compensation value in a summing circuit 515. The compensation value is generated by a DC offset calculator and compensation value generator circuit 535. A discussion about the generation of the compensation value will be presented later. The summing of the received signal and the compensation value in the summing circuit 515 removes the DC offset from the received signal. After the DC offset is removed in the summing circuit 515, the received signal is amplified in a variable gain amplifier 520 and filtered in a filter 525. The filter 525 is most commonly an anti-aliasing filter or a pulse shaping filter, with an intended purpose of ensuring that only the desired signals progress further into the radio receiver. After filtering, the received signal is ready for further processing to convert the received signal into usable data. The further processing is done in the digital domain by a baseband processing block 540. An analog-to-digital converter circuit 530 performs the analog-to-digital conversion. After processing in the baseband processing block, the received signal becomes digital data that is usable by whatever device is connected to the radio receiver 500.

The DC offset calculator and compensation value generator circuit 535 is used to generate the compensation value that is used by the summing circuit 515 to remove the DC offset from the received signal. The first part of the compensation value generation is done in the DC offset calculator portion of the DC offset calculator and compensation value generator circuit 535. The DC offset calculator takes a symbol as it comes out of the analog-to-digital converter circuit 530 and performs a summation on every data point within the symbol. The summation provides the DC offset for the particular symbol. If the symbol has no DC offset, the summation of the symbol will be zero. Another preferred embodiment of the present invention performs the summation operation on an analog symbol.

Figure 6:
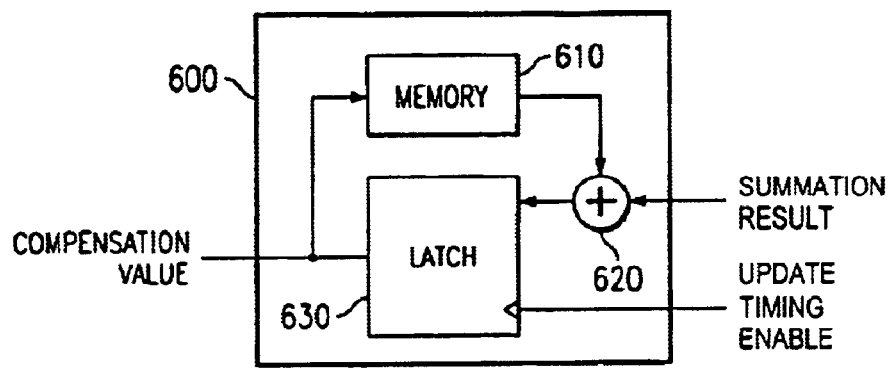
FIG. 6 is a diagram illustrating a compensation value generator circuit according to a preferred embodiment of the present invention.

The result of the summation is provided to the compensation value generator circuit portion of the DC offset calculator and compensation value generator circuit 535. Refer now to FIG. 6 for a block diagram of the compensation value generator circuit 600. The compensation value generator circuit 600 has two inputs, the summation result and an update timing enable signal (UTE). The summation result is the result of the summation of the symbol provided by the DC offset calculator portion of the DC offset calculator and compensation value generator circuit 535. The update timing enable signal is a signal that provides information about when a symbol begins and ends and when a guard band begins and ends. This timing information can be provided by the baseband processing block 540. Alternatively, the update timing enable can be provided by a timing circuit in the radio receiver that is not shown.

In the real world, the summation of a signal will rarely be exactly equal to zero, even if it has no DC offset. This is due to the randomness that is inherent in the signal and the random occurrence of errors in the signal. Therefore, the result of the summation will continue to vary as the signal is received by the receiver changes. This variation in the summation, when subtracted from the signal will introduce errors into signal when the baseband processing block 540 processes the data symbols.

Therefore the function of the update timing enable is crucial. By preventing updates to the compensation value from occurring while the receiver is receiving a data symbol, variations that show up in the summation are not reflected in the data symbol. The update timing enable permits updates to the compensation value to occur only when the receiver is receiving a guard band, therefore, any variations in the summation that are reflected in the guard band does not affect the performance of the receiver.

The compensation value generator circuit 600 has a memory 610 that is used to store a compensation value for the previous data symbol. The compensation value of the current data symbol is a function of the DC offset of the current data symbol as calculated by the DC offset calculator and the compensation value (its DC offset) of the previous data symbol. Because the summing circuit 515 has removed the compensation value of the previous data symbol from the current data symbol, the DC offset of the current data symbol as calculated by the DC offset calculator is in actuality that data symbol's DC offset minus the DC offset of the previous data symbol. Therefore, in order to accurately determine the current data symbol's DC offset, the previous data symbol's compensation value (its DC offset) must be added to the current data symbol's calculated DC offset. The compensation value for the current data symbol is therefore the DC offset calculated by the DC offset calculator plus the previous data symbol's compensation value. The summation is performed in an adder 620 and is the current data symbol's compensation value.

The update timing enable signal is used to control the propagation of the new compensation value. When the radio receiver is still receiving a symbol, the update timing enable signal prevents the compensation value from propagating to the summing circuit 515. In the preferred embodiment of the present invention, the DC offset calculator does not perform the summation on the data points in the symbol until the complete symbol has been received by the radio receiver. Once the radio receiver begins to receive the guard band, the DC offset calculator performs the summation and the update timing enable signal allows the compensation value to propagate to the summing circuit 515. The update timing enable signal allows changes in the compensation value to propagate by enabling a latch 630 which stores the new compensation value and allows it to propagate to the summing circuit 515 and the memory 610. The update timing enable signal does not prevent the calculation of the summation or the new compensation value, it prevents the propagation of the new compensation value beyond the DC offset calculator and compensation value generator circuit 535. The new compensation value must be determined prior to the end of the guard band and it must be updated at the summing circuit 515 before the next symbol begins at the summing circuit. In an alternate embodiment of the present invention, the DC offset calculator performs the summation on the data points of the symbol immediately as they are converted by the analog-to-digital converter 530 and provides the result to the compensation value generator 600. Hence, the compensation value is continually updated. However, since the update timing enable signal is not enabled, the compensation value is not propagated.

The table below displays an example of the calculations performed in the preferred embodiment of the present invention, where "Comp Value" is the compensation value used by the summing circuit 515 and "Comp Value +" is the new compensation value generated by the compensation value generator 600 and "Sum Result" is the DC offset measured by the DC offset calculator for the current symbol. The example below may not display realistic voltage values for DC offsets in a radio receiver and is intended solely for discussion purposes.

| Symbol Number | DC Offset | Comp Value | Sum Result | Comp Value + |
|---|---|---|---|---|
| 1 | 1.0 | 0.0 | 1.0 | 1.0 |
| 2 | 1.1 | 1.0 | 0.1 | 1.1 |
| 3 | 1.2 | 1.1 | 0.1 | 1.2 |

-continued

| Symbol Number | DC Offset | Comp Value | Sum Result | Comp Value + |
|---|---|---|---|---|
| 4 | 1.1 | 1.2 | −0.1 | 1.1 |
| 5 | 1.1 | 1.1 | 0.0 | 1.1 |
| 6 | 1.1 | 1.1 | 0.0 | 1.1 |

Symbol #1 has a DC offset of 1.0 volts, but due to the fact that symbol #1 is the first symbol received by the radio receiver and the compensation value is set to zero, the DC offset is not removed. The DC offset calculator circuit calculates the DC offset for symbol #1 to be 1.0 volts and 1.0 volts becomes the new compensation value. Symbol #2 has a DC offset of 1.1 volts. With a compensation value of 1.0 volts, the summing circuit 515 removes 1.0 volts out of symbol #2 total DC offset of 1.1 volts. The DC offset calculator circuit calculates the DC offset for symbol #2 to be 0.1 volts. The new compensation value is now 1.1 volts. The process continues for the remaining symbols in the example.

As shown in the example above, the DC offset can and does change over time. Therefore, the preferred embodiment of the present invention continues to measure the DC offset for every symbol received by the radio receiver and generate new compensation values as needed. The typical behavior for the DC offset is that it will vary dramatically during a radio receiver's training period and when the radio receiver is warming up. After the radio receiver is at operating temperature, the DC offset will usually vary more slowly and in smaller amounts. The radio receiver's training period occurs at system power-up and at data packet acquisition. At the beginning of a data packet, the radio transmitter transmits a special sequence of symbols and guard bands that permits the radio receiver to make adjustments to its various amplifiers and filters and other circuitry to optimize performance. Because wireless communications is performed over a dynamic environment and there may be more than one transmitter, channel dynamics are not constant, meaning that one setting that was optimal in one situation may not be optimal in another situation. At the beginning of each radio transmission, the radio receiver must be retrained to properly configure its equipment. Then during the radio transmission, it is necessary to adapt the receiver for optimal results.

Figure 7A:
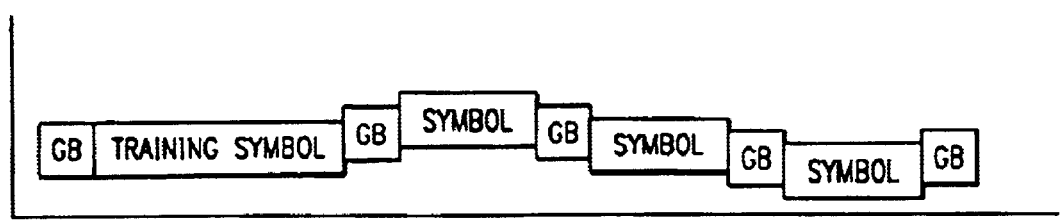
FIG. 7.a is a plot illustrating a data stream for a communications system with a time variant DC offset present in the data stream.
Figure 7B:
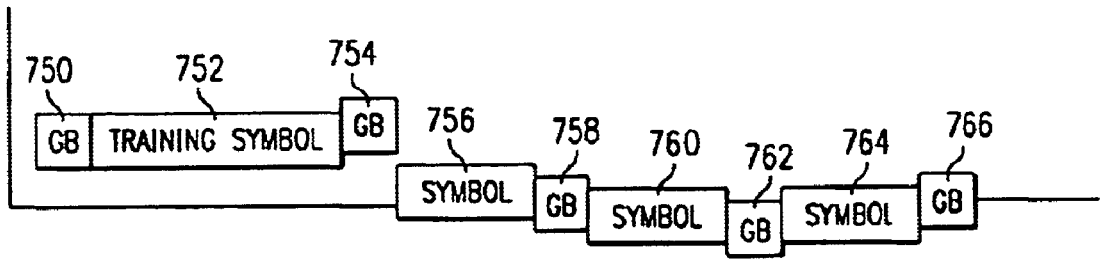

Refer now to FIG. 7.a and 7.b for diagrams displaying graphically the operation of the preferred embodiment of the present invention. FIG. 7.a displays four symbols and five guard bands on a set of axes. The symbols and guard bands are vertically displaced from the bottom of the axes by their respective DC offsets. FIG. 7.b displays the same set of four symbols and five guard bands after they have had their DC offsets removed by the preferred embodiment of the present invention. As discussed above, a first training symbol 752 and guard band 754 pair does not receive any DC offset removal due to the fact that the compensation value is initialized to zero and does not get calculated until after the first training symbol 752 has been received. Therefore, the first training symbol 752 and guard band 754 retain their DC offsets. A second symbol 756 and guard band 758 pair, however, does have its DC offset cancelled (at least a portion of its DC offset equal to the measured DC offset for the first training symbol 752). Hence, the second symbol 756 and guard band 758 pair is displayed as straddling the horizontal axes. The process continues for the remainder of the symbols and guard bands.

Figure 8:
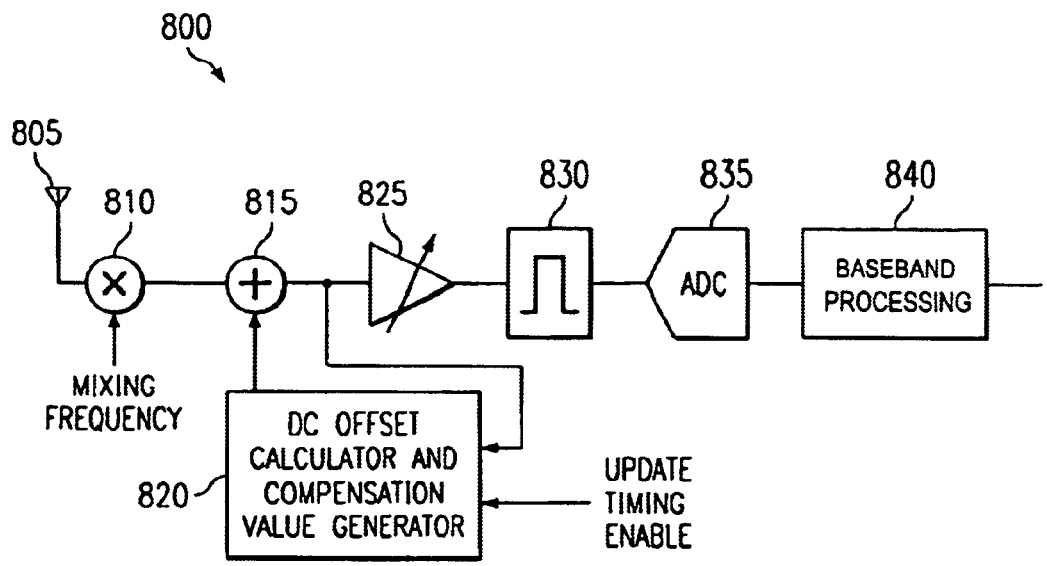
FIG. 8 is a diagram illustrating a DC offset removal apparatus according to another preferred embodiment of the present invention.

A second direct-conversion radio receiver 800 is shown schematically in FIG. 8, displaying a second preferred embodiment of the present invention. A radio antenna 805 receives a received signal which was transmitted over the air and sends the received signal to a downconversion mixer circuit 810. The received signal was modulated onto a high frequency carrier signal by a radio transmitter and it needs to be demodulated down to a baseband frequency.

The downconversion mixer circuit 810 multiplies the received signal with a mixing frequency. After being downconverted, the received signal is combined with a compensation value in a summing circuit 815. The compensation value is generated by a DC offset calculator and compensation value generator circuit 820. The summing of the received signal and the compensation value in the summing circuit 815 removes the DC offset from the received signal. The input of the DC offset calculator and compensation value generator circuit 820 is coupled to the output of the downconversion mixer circuit 810. In the second preferred embodiment of the present invention, the DC offset calculation is performed on an analog symbol, however, the DC offset calculator and compensation value generator circuit may contain an analog-to-digital converter circuit (not shown) to perform the analog-to-digital conversion. After the DC offset is removed in the summing circuit 815, the received signal is amplified in a variable gain amplifier 825 and filtered in a filter 830. After filtering, the received signal is ready for further processing to convert the received signal into usable data. The further processing is done in the digital domain by a baseband processing block 840. An analog-to-digital converter circuit 835 performs the analog-to-digital conversion. After processing in the baseband processing block, the received signal becomes digital data that is usable by whatever device is connected to the radio receiver 800.

The DC offset calculator and compensation value generator circuit 820 has a second input, an update timing enable signal. The update timing enable signal controls the update of the compensation value and is derived from the beginning and endings of the symbols and the guard bands. The update timing enable permits updating of the compensation value only during a guard band.

Figure 9:
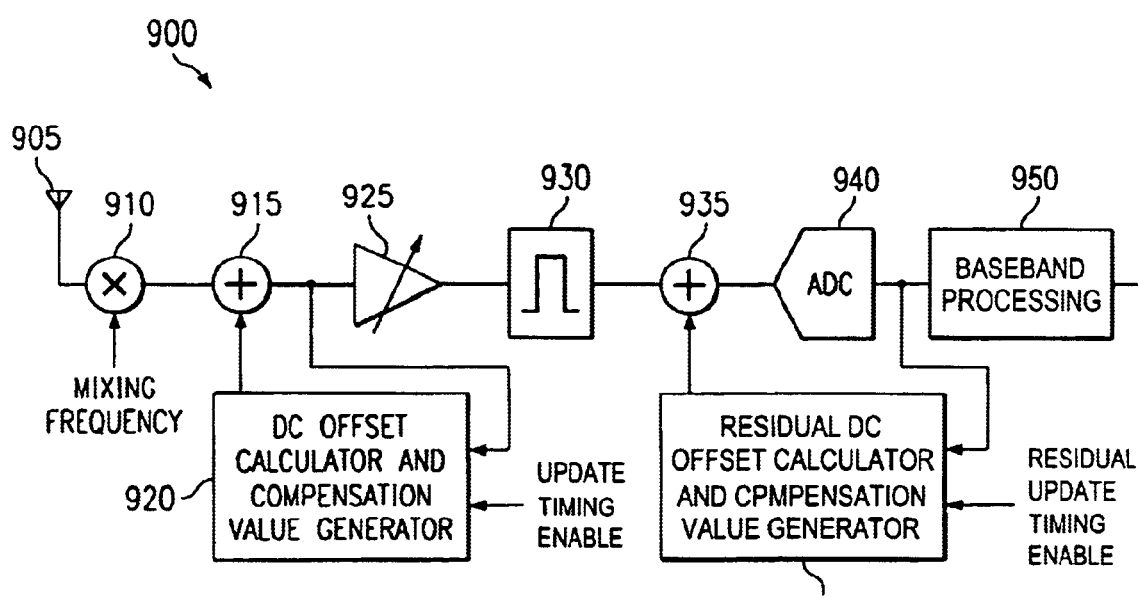
FIG. 9 is a diagram illustrating a DC offset removal apparatus according to yet another preferred embodiment of the present invention.

Refer now to FIG. 9 for a diagram illustrating a direct-conversion radio receiver 900, displaying a third preferred embodiment of the present invention. A radio antenna 905 receives a received signal which was transmitted over the air and sends the received signal to a downconversion mixer circuit 910. The downconversion mixer circuit 910 multiplies the received signal with a mixing frequency. After being downconverted, the received signal is combined with a compensation value in a summing circuit 915. The compensation value is generated by a DC offset calculator and compensation value generator circuit 920. The summing of the received signal and the compensation value in the summing circuit 915 removes most of the DC offset from the received signal. The DC offset calculator and compensation value generator circuit is coupled to the output of the downconversion mixer circuit 910. In the third preferred embodiment of the present invention, the DC offset calculation is performed on an analog symbol, however, the DC offset calculator and compensation value generator circuit may contain an analog-to-digital converter circuit (not shown) to perform the analog-to-digital conversion. After the DC offset is removed in the summing circuit 915, the received signal is amplified in a variable gain amplifier 925 and filtered by a filter 930.

After filtering, the received signal enters a second summing circuit 935 where any residual DC offset that was not removed by the first summing circuit 915 is removed by combining the received signal with a second compensation value. The second summing circuit 935 receives the second compensation value from a residual DC offset calculator and compensation value generator circuit 945. In the third preferred embodiment of the present invention, the residual DC offset calculator and compensation value generator circuit 945 is functionally equivalent to the DC offset calculator and compensation value generator circuit 920 with the exception that the residual DC offset calculator and compensation value generator circuit 945 performs its calculation on a digital symbol instead of an analog symbol as the DC offset calculator and compensation value generator circuit 920. The compensation generator circuit 945 is used to eliminate any residual offset seen by the analog-to-digital converter that was introduced after the first summing circuit 915 or by incomplete cancellation by circuit 920.

The residual DC offset calculator and compensation value generator circuit 945 is controlled by a residual update timing enable (RUTE) signal which is analogous to the UTE signal that controls the DC offset calculator and compensation value generator circuit 920.

According to a preferred embodiment of the present invention, the DC offset calculator and compensation value generator circuit 920 is used for coarse DC offset removal while the residual DC offset calculator and compensation value generator circuit 945 is used for fine DC offset removal. For example, the DC offset calculator and compensation value generator circuit 920 is used to remove a sufficient amount of DC offset so that the residual DC offset calculator and compensation value generator circuit 945 is able to operate with greater resolution and finer detail to remove as much of the remaining DC offset as possible. According to another preferred embodiment of the present invention, the DC offset calculator and compensation value generator circuit 920 is used to remove a majority of the DC offset and then it is locked down, i.e., it is no longer adjusted, and the residual DC offset calculator and compensation value generator circuit 945 is used to remove any remaining DC offset.

The received signal is then ready for further processing to convert the received signal into usable data. The further processing is done in the digital domain by a baseband processing block 950. After processing in the baseband processing block 950, the received signal becomes digital data that is usable by whatever device is connected to the radio receiver 900.

In another preferred embodiment of the present invention, during the receipt of a packet, the DC offset calculator and compensation value generator circuit is designed to dynamically track the DC offset of the symbol as it is being received and is allowed to update the compensation value as needed only during the guard band. But when the radio receiver is receiving a symbol, the compensation value is locked down to the last compensation value generated during the receipt of the guard band.

The discussion of the multiple preferred embodiments of the present invention describes the implementation of the preferred embodiments using dedicated hardware with associated firmware. However, it is possible to implement the DC offset calculator and compensation value generator in software that is executing on a special purpose digital signal processor (DSP), a general purpose DSP, a special purpose microprocessor, or a general purpose microprocessor.

Additionally, the discussion of the multiple preferred embodiments used the example of a wireless communications system. It should be apparent to a person practiced in the art of the present invention that the present invention is able to remove the DC offset of any data signal that uses a data symbol separated by a guard band method for sending data. The invention does not require the use of over the air transmission of data.

As will be apparent from the above description, the preferred embodiments provide several advantageous features including a method that removes DC offset and only the DC offset, without distorting the symbols or injecting noise into the digital wireless communications system.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus for removing DC offset in a data signal comprising:
   a data input;
   a summing circuit, having a first input coupled to said data input and a second input coupled to a DC offset calculator circuit and a output coupled to a signal processing circuit, adapted to combining said data signal with a compensation value from said DC offset calculator circuit, removing said compensation value from said data signal;
   said signal processing circuit, having an input coupled to said summing circuit and an output coupled to a data output, adapted to amplifying, filtering and converting said data signal;
   said DC offset calculator circuit, having a first input and having a second input coupled to an update timing enable signal line and an output coupled to said summing circuit, adapted to calculating a DC offset from said data signal and generating said compensation value based on said DC offset and outputting said compensation value;
   said update timing enable signal line, coupled to said DC offset calculator circuit, adapted to providing said DC offset calculator circuit with a signal enabling said DC offset calculator circuit to output said compensation value; and
   a data output.

2. An apparatus according to claim 1, wherein said DC offset calculator circuit calculates said DC offset on a digital representation of said data signal.

3. An apparatus according to claim 1. wherein said DC offset calculator circuit generates said compensation value based on said DC offset and a previous compensation value.

4. An apparatus according to claim 1, wherein said update timing enable signal enables outputting said compensation value when said data signal on said data input is a guard band and disables outputting said compensation value when said data signal on said data input is a symbol.

5. An apparatus according to claim 4, wherein said DC offset calculator circuit does not generate said compensation value until said data signal on said data input is a guard band.

6. An apparatus according to claim 1, wherein said signal processing circuit is comprising:
   a variable gain amplifier, having an input coupled to said input of said signal processing circuit and an output coupled to a filter circuit, adapted to amplifying said data signal;
   said filter circuit, having an input coupled to said variable gain amplifier and an output coupled to an analog-to-digital converter circuit, adapted to filtering said data signal; and said analog-to-digital converter circuit, having an input coupled to said filter circuit and an output coupled to said output of said signal processing circuit, adapted to converting said data signal into a digital representation of same.

7. An apparatus according to claim 1, wherein said DC offset calculation is summing of all signal values in said data signal.

8. An apparatus according to claim 1, wherein said first input of said DC offset calculator circuit is coupled to said output of said signal processing circuit.

9. An apparatus according to claim 1, wherein said first input of said DC offset calculator circuit is coupled to said data input.

10. An apparatus according to claim 9, wherein said DC offset calculator circuit calculates said DC offset on an analog representation of said data signal.

11. An apparatus according to claim 9, wherein:
said signal processing circuit is comprising:
a processing circuit, having an input coupled to said output of said summing circuit and an output coupled to a second summing circuit, adapted to amplifying and filtering said data signal;
said second summing circuit, having a first input coupled to said output of said processing circuit and a second input coupled to an output of a residual DC offset calculator circuit and an output coupled to said output of said signal processing circuit, adapted to combining said data signal with a second compensation value from said residual DC offset calculator circuit, removing said second compensation value from said data signal; and
said apparatus further comprising said residual DC offset calculator circuit, having a first input coupled to said output of said signal processing circuit and a second input coupled to said update timing enable signal and an output coupled to said second summing circuit, adapted to calculating a residual DC offset from said data signal and generating said second compensation value based on said residual DC offset and outputting said compensation value.

12. An apparatus according to claim 11, wherein said residual DC offset calculator circuit generates said second compensation value based on said residual DC offset and a previous second compensation value.

13. An apparatus according to claim 11, wherein said signal processing circuit is further comprising an analog-to-digital converter circuit, having an input coupled to said output of said second summing circuit and an output coupled to said output of said signal processing circuit.

14. An apparatus according to claim 11, wherein said processing circuit is comprising:
a variable gain amplifier, having an input coupled to said input of said processing circuit and an output coupled to a filter circuit, adapted to amplifying said data signal; and
said filter circuit, having an input coupled to said variable gain amplifier and an output coupled to said output of said processing circuit, adapted to filtering said data signal.

15. A method for DC offset removal in a data signal comprising:
receiving said data signal;
calculating said DC offset for said data signal;
generating a compensation value based on said DC offset;
updating said compensation value when said data signal is a guard bend; and
applying said compensation value to said data signal, wherein said generating said compensation value is based upon a previous compensation value and said DC offset.

16. A method according to claim 15, wherein said step of calculating said DC offset involves summing all signal values of a data symbol.

17. A system for receiving data signals with a built-in apparatus for removing DC offset in said data signals comprising:
a data input, coupled to a down conversion mixer, adapted to providing said date signals;
said down conversion mixer circuit, having a first input coupled to said data input and a second input coupled to a mixing frequency and an output coupled to a summing circuit, adapted to converting said data signals from a carrier frequency down to a baseband frequency;
a summing circuit, having a first input coupled to said down conversion mixer circuit and a second input coupled to a DC offset calculator circuit and an output coupled to a signal processing circuit, adapted to combining said data signal with a compensation value from said DC offset calculator circuit, removing said DC offset from said data signal;
said signal processing circuit, having an input coupled to said summing circuit and an output coupled to a baseband processing circuit, adapted to amplifying, filtering and converting said data signal;
said baseband processing circuit, having an input coupled to said analog-to-digital converter circuit and an output coupled to a data output, adapted to decoding said data symbol, providing data;
said DC offset calculator circuit, having a first input and a second input coupled to an update timing enable signal line and an output coupled to said summing circuit, adapted to calculating a DC offset from said data signal and generating said compensation value based on said DC offset and outputting said compensation value;
said update timing enable signal line, coupled to said DC offset calculator circuit, adapted to providing said DC offset calculator circuit with a signal that enables said DC offset calculator circuit to output said compensation value; and
said data output, coupled to said baseband processing circuit, adapted to providing said data.

18. A system according to claim 17, wherein said first input of said DCs offset calculator circuit is coupled to said output of said signal processing circuit.

19. A system according to claim 17, wherein said first input of said DC offset calculator circuit is coupled to said output of said downconversion mixer circuit.

20. A system according to claim 19, wherein said signal processing circuit is comprising:
a processing circuit, having an input coupled to said output of said summing circuit and an output coupled to a second summing circuit,
adapted to amplifying and filtering said data signal;
said second summing circuit, having a first input coupled to said output of said processing circuit and a second input coupled to an output of a residual DC offset calculator circuit and an output coupled to said output of said signal processing circuit, adapted to combining said data signal with a second compensation value from said residual DC offset calculator circuit, removing said second compensation value from said data signal; and further comprising said residual DC offset calculator circuit, having a first input coupled to said output of said signal processing circuit and a second input coupled to said update timing enable signal and an output coupled to said second summing circuit, adapted to calculating a residual DC offset from said data signal and generating said second compensation value based on said residual DC offset and outputting said compensation value.

21. A system according to claim 17, wherein said DC offset removal apparatus operates during a training period.

22. The apparatus of claim 17, wherein the apparatus is configured to operate during a training period.

23. A method of processing a signal comprising:
calculating a DC offset for a first data symbol of the signal; and
compensating the first data symbol in a first time period using a first compensation value, wherein the first compensation value comprises the DC offset of the first data symbol and a second compensation value, wherein the second compensation value is used to compensate a second data symbol of the signal in a time period prior to the first time period.

24. An apparatus for processing a signal comprising:
a first DC offset generating unit configured to generate a first compensation value for a first data symbol of the signal;
a first signal compensation unit coupled to the first DC offset generating unit and configured to compensate the first data symbol in a first time period using the first compensation value, wherein the first compensation value comprises a DC offset of the first data symbol and a second compensation value, wherein the second compensation value is used by the first signal compensation unit to compensate a second data symbol of the signal in a time period prior to the first time period.

25. The apparatus of claim 24, wherein the first DC offset generating unit is further configured to:
calculate the DC offset for the first data symbol; and
combine it with the second compensation value to generate the first compensation value.

26. The apparatus of claim 25, wherein the first DC offset generating unit is further configured to calculate the DC offset on a digital representation of the signal.

27. The apparatus of claim 25, wherein the first DC offset generating unit is further configured to calculate the DC offset on an analog representation of the signal.

28. The apparatus of claim 24, wherein the first signal compensation unit is a summing circuit.

29. The apparatus of claim 24, further comprising:
an amplifier coupled to the first signal compensation unit and configured to amplify the signal;
a filter coupled to the amplifier and configured to filter the signal according to a desired bandwidth;
an analog-to-digital converter coupled to the filter and configured to generate a digital representation of the signal; and
a baseband processing unit coupled to the analog-to-digital converter and configured to process the signal.

30. The apparatus of claim 29, further comprising:
a second DC offset generating unit coupled to an output of the analog-to-digital converter and configured to generate a third compensation value; and
a second signal compensation unit coupled between the filter and the analog-to-digital converter and configured to use the third compensation value to further compensate the first data symbol of the signal.

31. The apparatus of claim 24, wherein the first DC offset generating unit generates the first compensation value during a guard band period of the signal.

* * * * *